United States Patent [19]

Stevens et al.

[11] Patent Number: 5,187,937
[45] Date of Patent: Feb. 23, 1993

[54] GAS TURBINE ENGINE COMBUSTORS

[75] Inventors: Stanley J. Stevens, Leicestershire; Jonathan F. Carrotte, Leics, both of England

[73] Assignee: The Secretary of State for Defence in Her Britannic Majesty's Government of the United Kingdom of Great Britain and Northern Ireland, London, England

[21] Appl. No.: 659,353
[22] PCT Filed: Jun. 22, 1988
[86] PCT No.: PCT/GB88/00476
§ 371 Date: Feb. 19, 1991
§ 102(e) Date: Feb. 19, 1991
[87] PCT Pub. No.: WO89/12788
PCT Pub. Date: Dec. 28, 1989
[51] Int. Cl.⁵ .............................................. F23R 3/04
[52] U.S. Cl. ........................................ 60/752; 60/759
[58] Field of Search ................. 60/752, 755, 757, 759, 60/760; 431/350, 351, 352

[56] References Cited

U.S. PATENT DOCUMENTS 2,826,039  3/1958  Ashwood ............................... 60/752
2,916,878 12/1959  Wirt ....................................... 60/759
3,919,840 11/1975  Markowski ............................ 60/760
4,653,279  3/1987  Reynolds .............................. 60/757
4,875,339 10/1989  Rasmussen et al. .................. 60/759

FOREIGN PATENT DOCUMENTS 2636520  2/1978  Fed. Rep. of Germany.
1331084 11/1963  France.
 676473  7/1952  United Kingdom .................. 60/752
 819065  8/1959  United Kingdom.
 943250 12/1963  United Kingdom.
2017827 10/1979  United Kingdom.
2113377  8/1983  United Kingdom.

Primary Examiner—Richard A. Bertsch
Assistant Examiner—Timothy S. Thorpe
Attorney, Agent, or Firm—Nixon & Vanderhye

[57] ABSTRACT

A gas turbine engine combustor, eg of annular combustor configuration, has air inlets, typically in the dilution zone, which incorporate vortex generators operative to trip the inlet jet flow causing stabilizing vortex flow at the lateral edges of the jet. The vortex generators can comprise an inwardly directed abrupt change of section between forward and rearward parts of the air inlets. The rearward section of the air inlets can have a configuration operative to reinforce the jet stabilizing effect of the vortex flow. The combustor exhibits improved uniformity of jet and crossflow mixing.

7 Claims, 17 Drawing Sheets $R_p = 9.5$ mm
$D = 25.4$ mm

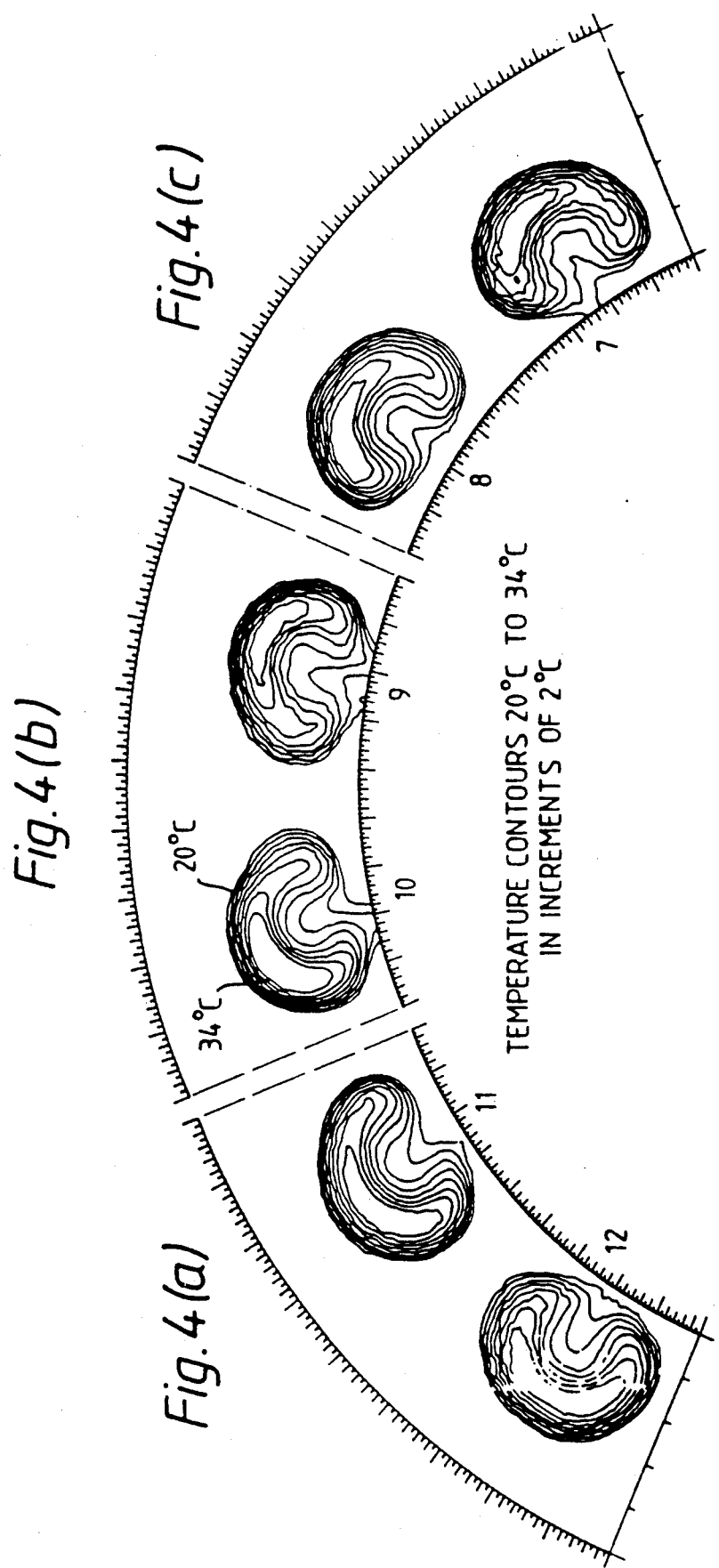

VELOCITY DISTRIBUTION
HOLE 10, X/D = 0.30

TEMPERATURE DISTRIBUTION

HOLE 10 Y/D = 0.20

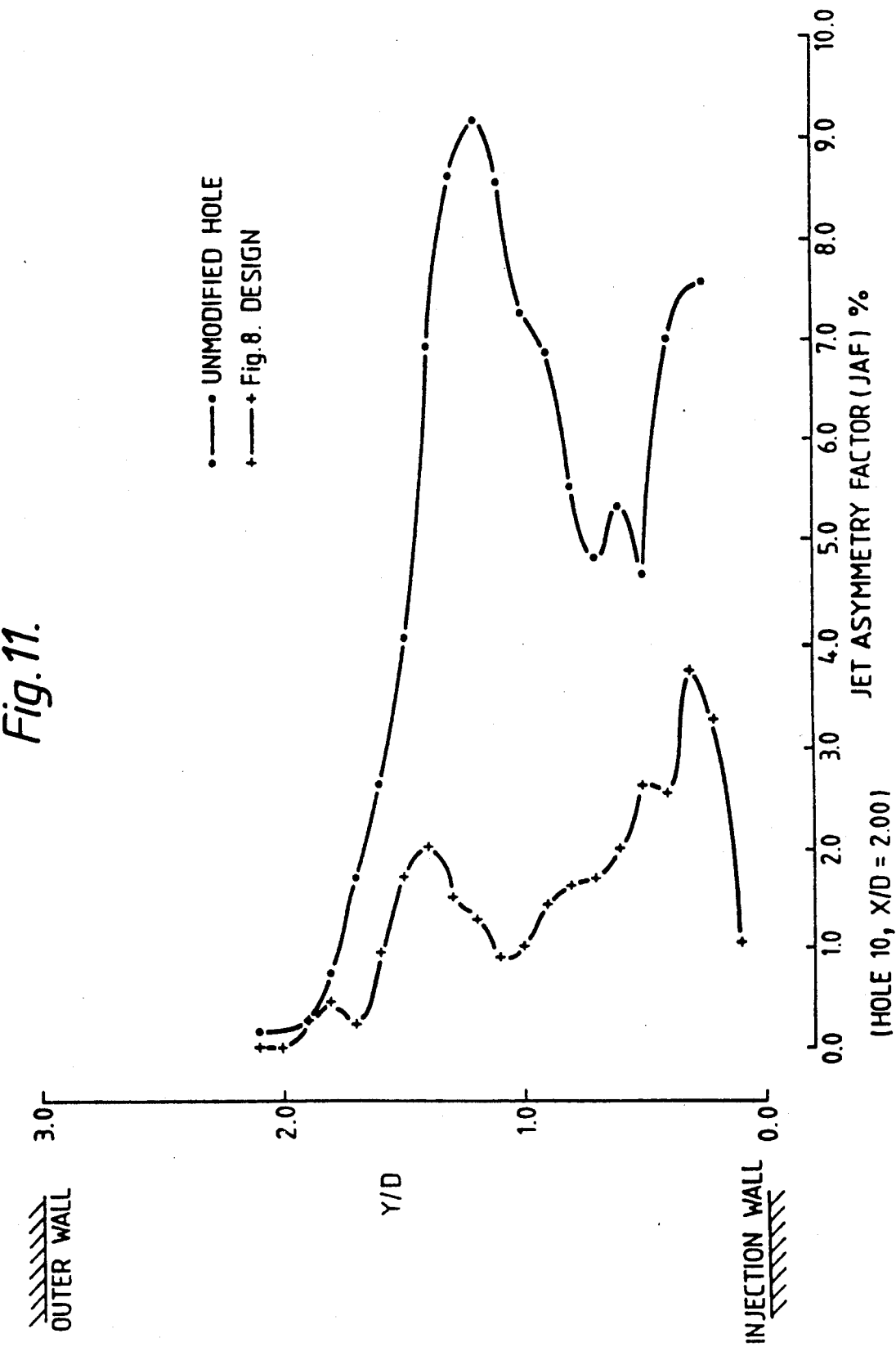

UNMODIFIED HOLE
(HOLE 10, X/D = 2.00)

Fig. 8. DESIGN

BACKSTOP HEIGHT = 7.62mm

UNMODIFIED HOLE

Fig.13. DESIGN HOLE - WITHOUT BACKSTOP

Fig.13. DESIGN HOLE - WITH BACKSTOP

CROSS-FLOW

CROSS-FLOW

RAPID CHANGE IN HOLE GEOMETRY INITIATES VORTEX DEVELOPMENT

CROSS-FLOW

CROSS-FLOW

HOLE GEOMETRY INITIATES VORTEX DEVELOPMENT

COMPLEX FLOW-FIELD CENTRALISED AT REAR OF HOLE

CROSS-FLOW

VORTEX TRIP UPSTREAM OF HOLE

CROSS-FLOW

VORTEX TRIP LOCATED IN FEED ANNULUS

CROSS-FLOW

VORTEX TRIP

CROSS-FLOW

VORTEX TRIP

GAS TURBINE ENGINE COMBUSTORS

BACKGROUND OF THE INVENTION

1. Field of the Invention

This invention relates to gas turbine engine combustors having improved arrangements for the provision of air to the interior of the combustion chambers, especially improved arrangements for the provision of that air required for the cooling of the combustion products in the downstream zones within the combustion chamber but not solely these.

2. Discussion of Prior Art

The commercial drive for improved gas turbine engine performance, especially in aircraft engines, renders desirable an increase in turbine inlet temperatures for this would convey an increase in cycle efficiency. The scope for increasing engine efficiency by increase in turbine inlet temperature would seem to dwarf that which could be secured by improvements in aerodynamic design in the compressor and turbine sections. However in current generation engines, particularly advanced military aircraft engines, turbine inlet temperatures are already such as to impose a severe restriction on the useful life of turbine section components despite the use of the best of current generation materials and cooling arrangements within the turbine section. Moreover, at the same time as there is a drive for improved engine performance (as measured by specific fuel consumption) there is a parallel drive for improved component life both in current engines as well as those at the development stage. It is obvious that these two goals will be mutually incompatible unless there is some considerable improvement in engine materials or engine design.

One way in which significant improvements might be achieved without revolutionary change to engine designs or step advances in materials, is by providing a more uniform temperature within the turbine entry flow through improvement in the combustor. Certainly, it has been recognised for some time by those in the art that current generation engines (especially those of the annular combustor design) convey to the turbine a flow of gases having significant variations of temperature from point to point within the turbine entry. A consequence of this is that either the temperature capability of turbine section components, or their endurance, is not utilized to the full but wasted by local hotspots or the like which do not contribute in any way to cycle efficiency. Even when the mean turbine entry temperature is not excessive, stationary hot spots can damage individual turbine guide vanes and a poor radial temperature profile (i.e. across the annulus) can cause uneven degradation of aerodynamic components from root to tip. Considerable progress has already been made in the area of combustion chamber design having regard to those features of earlier designs which produced traceable and detrimental results. Despite these improvements made to date it would be typical for a current generation aircraft engine of the annular combustor type to exhibit an overall temperature distribution factor (OTDF) of say 25%. OTDF is a measure of the highest point temperature less the mean of point temperatures. A figure of 25% obviously means there is still room for improvement in this regard. It is likely however that a new approach to this aspect of performance will be required if any significant reduction of the 25% figure is to be secured.

It has been noticed in the art that in addition to those irregularities in temperature within the turbine entry flow of an annular combustor engine which are traceable to particular known origins within the combustor and can be avoided—such as problems caused by disruption of boundary layers—there is a significant degree of variation which has not been ascribed to any known origin. The term 'randomness' has been coined to describe these variations. It is known for example that a particular engine might produce a hot spot (or spots) within the turbine entry field which is consistent in location from engine run to engine run and yet another engine made to the same construction might have its own peculiar hot spots different in location or intensity to the first. It has been suggested that one of the main sources of these asymmetries within an engine's turbine entry field is irregularities within the primary zone of the combustion chamber. However, even in experiments with carefully controlled primary zone exit conditions the effect has persisted and this has led to the suspicion that the asymmetries are created within the dilution zone of the combustion chamber.

Before giving further consideration to the source of the problem addressed in this specification, some discussion of the arrangements found in a conventional gas turbine engine combustor is warranted in order to elucidate the background to the problem and to clarify the terminology used herein. In a typical present day gas turbine combustor there is a combustion liner which may be considered as comprising two or three distinct regions each with its own typical configuration. At the forward end of the combustion chamber (i.e. that end adjacent the compressor outlet) there is a region known as the primary zone in which the primary combustion takes place. The primary zone has arrangements for supplying atomised or vaporised fuel and arrangements for supplying air such that a stabilized recirculatory flow is established for the purposes of maintaining the continuous ignition of new reactants on a localised or general level. At the rearward end of the combustion casing there is a region known as the dilution zone in which air is introduced to the interior entirely for the purpose of cooling and regulating the distribution of the hot gases resulting from combustion to a level tolerable by turbine section components. Usually there is also a region intermediate the primary zone and the dilution zone which is called the intermediate or secondary zone in which air is introduced to the interior for the purpose of completing the combustion process for avoidance of smoke and other emissions and for the avoidance of dissociation loss. The boundary between these three zones is more or less distinct according to combustor design and the intermediate zone may not exist in all combustors as a distinct recognisable zone. The combustion liner sits within an air casing and a portion of the compressor delivery air is funnelled into the space between the combustion liner and the air casing from whence it is fed to the combustion chamber in the various zones.

In the dilution zone this compressor delivery air is introduced to the combustion chamber through relatively large holes in the combustion liner with a view to achieving sufficient cooling jet penetration into the crossflow from the forward zones to secure a turbine entry. The source of the air in these cooling jets is of course the compressor delivery air which is flowing along the outside of the combustion liner and within the air casing.

The characteristics of a single jet, such as a dilution jet, issuing transversely into a crossflow, (typically at 60° say), such as the hot gases from the primary and intermediate zones are well established. An analytical and descriptive text covering this topic may be found at page 117 et seq of Gas Turbine Combustion written by A. H. Lefebvre (published by the McGraw Hill Book Company ISBN 0-07-037029-X) and also in a paper presented by the inventors named in this application, at the 23rd AIAA/SAE/ASME/ASEE Joint Propulsion Conference of Jun. 29-Jul. 2, 1987. This paper is available in reprint form from the American Institute of Aeronautics and Astronautics under reference AIAA-87-1827. Both these above works will be mentioned further in this specification.

The single jet which issues from its source has momentum which projects it into the crossflow causing an obstruction to that crossflow and consequent downstream deflection of the jet from its initial trajectory. There is intensive mixing between jet and crossflow which creates a turbulent shear layer around the periphery of the jet. Gas within this shear layer has less momentum in the direction of the jet than that within the core and consequently it suffers more downstream deflection than the core flow at the sides of the jet where it is free to adopt a different trajectory. This leads to a jet section, downstream of the inlet, which is kidney shaped with the lobes on the inlet side of the jet. Within this overall kidney section there is vortical flow in each lobe with the core gas being swept downstream from the forward and lateral edges and recirculating through the middle of the core.

The situation in a real dilution zone where there are multiple jets and interaction between individual jets is not so clearly established. Generally the flow phenomenon will be similar to that of the single jet. However, the jets present a significant obstruction to the crossflow gases and this blockage effect leads to the creation of a sympathetic pattern of double vortex flow within the crossflow gases in the wake of each jet. There are other complications as well as this one. It has been known for some time that in certain circumstances of adverse dilution zone geometry it is possible for vortex flow to occur within the dilution jet at issue. In the inventors above-referenced paper it was demonstrated that this vortex flow can occur on a gross scale with respect to jet size and with varying degrees of intensity. This is a different phenomenon to that causing vortical flows within the jet and its wake after it issues for it is not a consequence of interaction between jet and crossflow being present within the jet as it leaves the hole. This vortex flow within the jet at issue can however effect that subsequent interaction and various simplistic design rules exist for the avoidance of this phenomenon, which are based on the geometry of the dilution zone. A. H. Lefebvre at page 114 of the above referenced book refers to two aspects of this in the following text:

"If the pitch of the dilution holes is greater than the annulus height, a vortex can form in the flow entering the hole; this changes the penetration and mixing characteristics of the dilution air jet. The strength of the vortex depends on the ratio of annulus area, as measured in the plane of the holes, to the hole area".

In Lefebvre's terminology the annulus is the space between the combustion liner and the surrounding air casing and annulus height is the radial distance between one and the other. Lefebvre reports also (at the same page) that: "Vortex formation, which can occur on both tubular and annular liners, may be eliminated or subdued by fitting a longitudinal splitter plate across (longitudinally with respect to the liner) each dilution hole. The plate . . . is effective when used in conjunction with spectacle plate or dam" (behind the dilution hole within the annulus). The above given quotations correspond to established thinking in the art. The established design aim has been to avoid dilution jet vortex flow by providing adequate annulus height if this is possible or failing this to suppress vortex development by use of splitter plates. However spurious irregularities in the temperature traverse of turbine entry flow have persisted despite this approach. Lefebvre at page 7 of his book gives one disadvantage of the annular combustor design as "Difficult to maintain stable outlet temperature traverse" albeit he seems to ascribe this to difficulty in maintaining a steady velocity profile in the inlet gases (compressor outlet flow).

A recent investigation of the inventors (published in their aforementioned paper) has shed new light on the flow and mixing phenomena within a realistic multiple jet dilution zone model. The model had simplified geometry representative of a typical present day annular combustion zone but with only single sided dilution. The model was manufactured to an extremely tight tolerance so as to remove physical irregularities as a source of flow disturbance. Furthermore, great care was taken to ensure that both the approach flow in the dilution zone and the feedflow to the dilution holes was uniform and consistent to the limits of measurement. This reported investigation demonstrated that there was vortex flow with the dilution jets at issue and confirmed that this vortex flow did significantly influence subsequent events within the dilution zone. The presence of this vortex flow is consistent with Lefebvre's hole pitch to annulus height criterion for the relevant dimensions of the model were 69.85 mm and 35.8 mm respectively. It was however unexpected because the model was representative of real engine designs and presumably not predicted by the design rules on which these real engines had been based. Moreover it was found that the dilution jet internal vortex flow varied in configuration, strength, and rotational sense from hole to hole around the dilution zone annulus. It was noticed that there was aerodynamic twisting of the jets from certain dilution holes at stations downstream of the dilution hole annulus which gave rise to circumferential asymmetry in the temperature distribution, and that the double vortex structure within the jet core (caused by interaction with the crossflow) usually consisted of vortices of unequal strength. It was concluded that (amongst other things) there was evidence to suggest that the direction and location of the vortices formed in the holes influences the rate of mixing between jet and crossflow fluid.

The nature of the in-hole vortex flow revealed by this published investigation suggests that it is not solely dictated by the overall geometry of the dilution zone and the presence of consistent hole to hole differences in a precision made model would seem to indicate that the basic dilution zone arrangements are not sufficiently aerodynamically stable to withstand minuscule irregularities still less those likely to be encountered in a production engine once subjected to thermal cycling in service.

SUMMARY OF THE INVENTION

It has since been demonstrated that it is possible to overcome the normally occurring randomness in the dilution zone by modifying the air inlet configuration in a particular way. The flow through these modified holes is tripped by vortex generators within or adjacent to the holes so as to create strong vortices at the lateral edges of the jet which are reinforced rather than decayed by interaction with adjacent crossflow. These specially created vortices occupy the same location in the downstream jetflow as would those vortices which are normally induced by interaction between jet and crossflow and give rise to the kidney shaped jet section. However the normal self-induced vortices are not sufficiently strong and consistent between opposite halves of the jet to prevent jet deviation and twisting. The specially created vortices overcome these limitations.

The invention is a gas turbine engine combustor having a combustion liner pierced by through-holes constituting air inlets, and having an air feed duct around the exterior of the combustion liner, there being in operation of the combustor a stream of air under pressure flowing along the air feed duct from which air flows through the air inlets to the interior of the combustion liner and issues as jets into a crossflow of gases, in which combustor the combustion liner is configured such that there is for each air inlet of an array thereof disposed over a portion of the combustion liner a respective vortex generator means adjacent or within the air inlet which is operative on a peripheral portion of the flow through the air inlet to establish in said flow a pair of opposite handed vortices disposed one to each half of the air inlet on an axis transverse to the crossflow, the vortices having a sense of rotation such that each vortex is reinforced by interaction with the crossflow at the outer lateral edges of the vortex pair.

Preferably each of the vortex generator means comprises a pair of forward facing and inwardly projecting trip surfaces one to each lateral edge of the air inlet with respect to the crossflow, although it is possible that a single central trip positioned adjacent but upstream of the air inlet in the air feed duct flow or the crossflow would have sufficient effect to be useful also.

It is desirable to avoid configurations requiring projections from the combustion liner into the crossflow at least on the upstream side of the air inlet and in regions where the crossflow gases are especially hot. It is preferable that the vortex generator means are constituted by the configuration of the air inlet through-holes rather than additional ancilliary parts. In a preferred arrangement the through-holes incorporate abrupt changes in section at their lateral edges between a broader forward section and a narrower rearward section. This creates an inwardly directed step in the wall contour which serves to trip the flow through the air inlet in the required manner, as that flow has a cross-hole component of velocity consequent upon its feed duct momentum.

In conventional prior art practice, the holes in the dilution zone of the combustion liner are either plain punched form holes (in those combustors having a wide feed annulus with consequent low feed flow rate) or are of plunged form in order to increase the discharge coefficient particularly in those combustors subject to higher feed flow rates. The plunged form holes are those bevelled on the feed side to provide a smooth transition.

In a preferred form of this invention the rearward section of the inlet (that part behind the trip surfaces) has rearwardly extending side walls leading to a part circular back wall with both side walls and back walls having plain unbevelled faces. This configuration of rearward section assists the jet stabilizing effect of the vortex generators by discouraging lateral deviation and spillage of the jet and by reinforcing the flow at the rear of the jet in the direction of the inlet axis. A similar effect in regard to the reinforcement of rear jet flow can be achieved by a backstop projection on the rearward periphery of the inlet on the interior (crossflow) side of the combustion liner.

BRIEF DESCRIPTION OF THE DRAWINGS

The invention is described below against the background of existing (prior art) dilution zone arrangements and rig measurements of the flow and temperature patterns in this zone, with reference to the drawings of which:

FIGS. 4a, 4b, and 4c are cross-dilution zone plot of temperature distribution for the baseline hole configuration;

FIG. 11 is a plot of jet asymmetry factor for the baseline inlet and the inlet design of FIG. 8;

DETAILED DISCUSSION OF PREFERRED EMBODIMENTS

Figure 1:
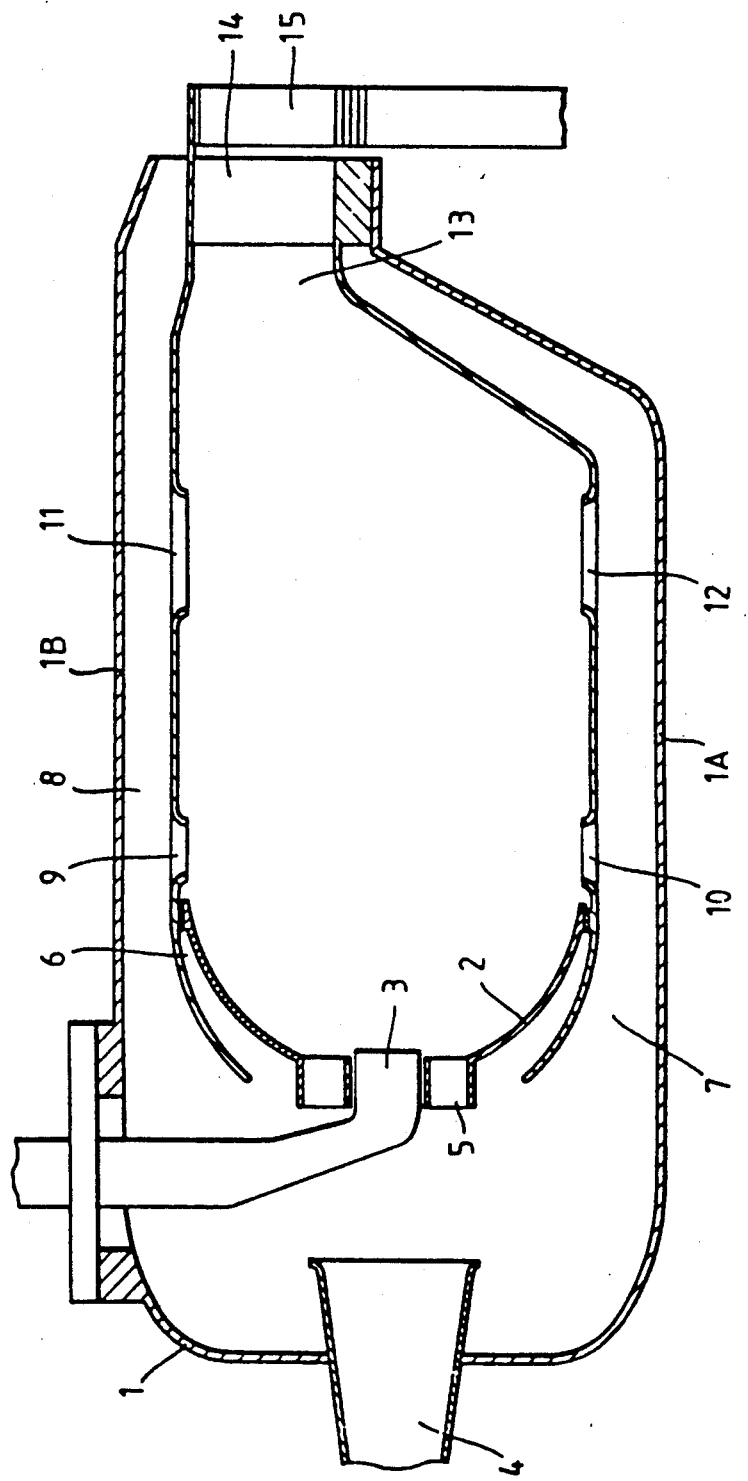
FIG. 1 is a half view in section of a representative present day combustor of the annular variety.

FIG. 1 depicts a schematic sectional half view of an annular combustor incorporating features typical of present day combustors. The main parts of the combustor are an air casing 1 (comprising separate inner and outer parts designated 1A and 1B respectively), a combustion liner 2 and a fuel injector 3. At the forward end of the air casing 1 is an inlet 4 having a diffuser section and air from the compressor stage flows into the air casing through this. This airflow divides within the air casing 1. A significant portion is introduced to the primary zone through swirler vanes 5 and wall cooling passages 6 etc. The remainder is directed along the outside of the combustion liner 2 into two separate air feed ducts 7 and 8 both of annular section. Duct 7 is defined by the combustion liner 2 and the inner part 1A of the air casing. Duct 8 is defined by the combustion liner 2 and the outer part 1B of the air casing. Air is fed from ducts 7 and 8 to the interior of the air casing in the intermediate or secondary zone through inlets 9 and 10 respectively and also in the dilution zone through inlets 11 and 12 respectively. All these inlets 9 through 12 are depicted as being of plunged form. At the rear end combustion liner 2 narrows to a nozzle 13 through which diluted airflow passes directly to the inlet guide vanes 14 and first row turbine blades 15 of the turbine section.

Figure 2:
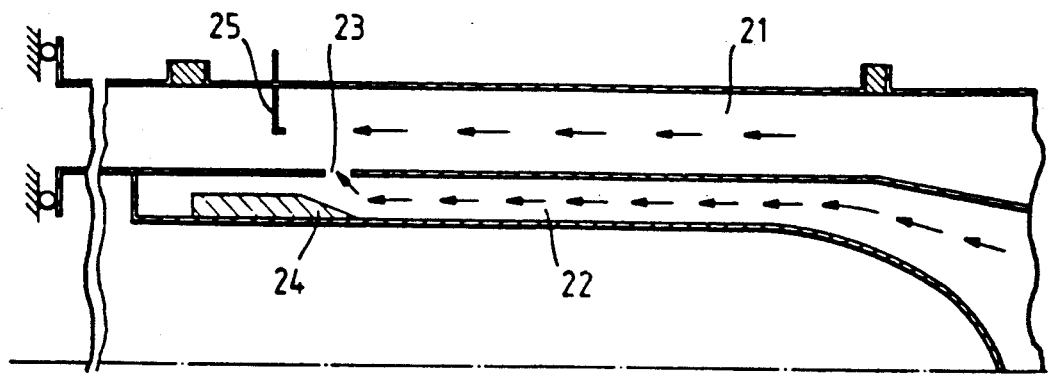
FIG. 2 is a half view in section of a flow modelling rest rig.

FIG. 2 depicts in a sectional half view the configuration of a test rig used to model and investigate the operation of the dilution zone of an annular combustor such as that depicted in FIG. 1. The rig is of full annular configuration comprising an outer passage 21 and an inner passage 22. The rig is arranged to provide a carefully controlled and uniform flow of air downstream along both these passages. The wall between the two passages is pierced by a circumferential row of sixteen holes 23 (spaced symmetrically on a 22.5° pitch) which represent the air inlets of the dilution zone. Air from inner passage 22 discharges from holes 23 as jets into the crossflow of air within outer passage 21. A wedge 24 is located on the inner wall of the feed annulus in order to minimise back pressure effects on the flow entering each dilution hole. In order to map the intermixing of the jet flow with the crossflow the air provided to the jets is heated to something like 30° C. above ambient temperature which is the temperature of the crossflow air. This is of course the inverse of the temperature difference present in a real combustor where the jets are much cooler than the crossflow but it is believed that this reversal of temperatures has no significant effect on the modelling accuracy in a vertical facility such as this one. A representative jet to crossflow velocity ratio of 2:1 is maintained. From the hole position downstream and from the inside of passage 21 to its outside, the flow can be measured in terms of velocity components by five hole pitot probe traverses and thermocouple traverses. A thermocouple is depicted at 25 in the Figure in order to illustrate a typical instrumentation station.

Figure 3A:
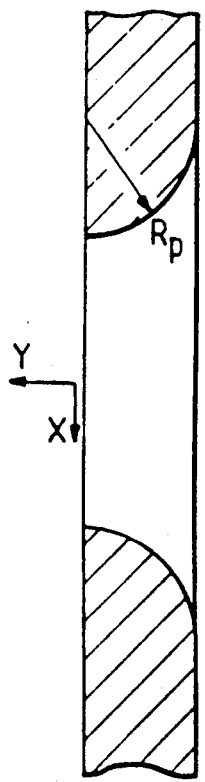
FIGS. 3a and 3b show the baseline (prior art) dilution hole configuration tested in the rig.
Figure 3B:
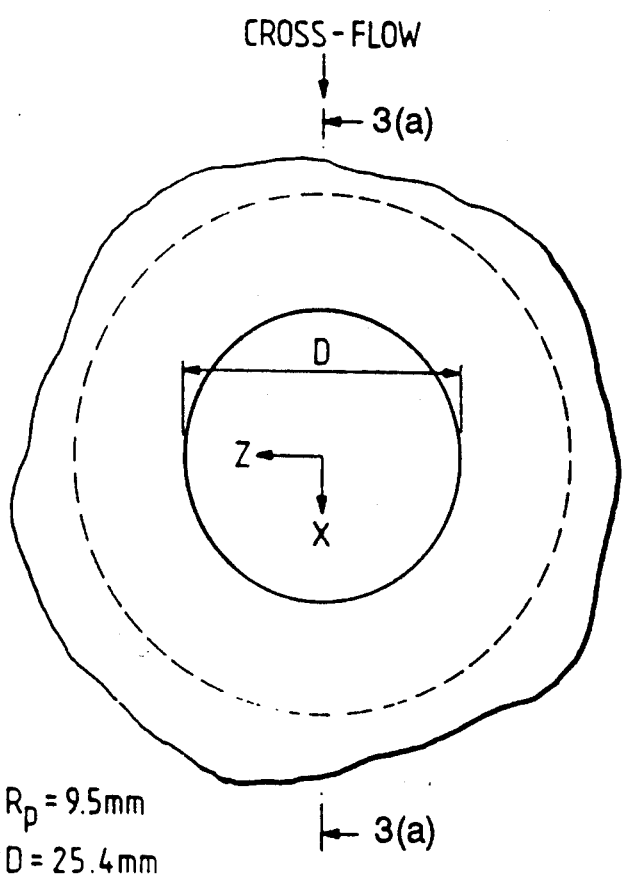
Figure 5C:
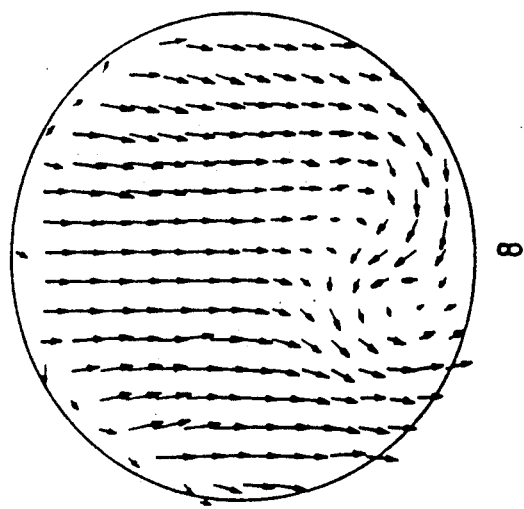
FIGS. 5a, 5b and 5c are cross-hole velocity plots for the baseline hole configuration.
Figure 5B:
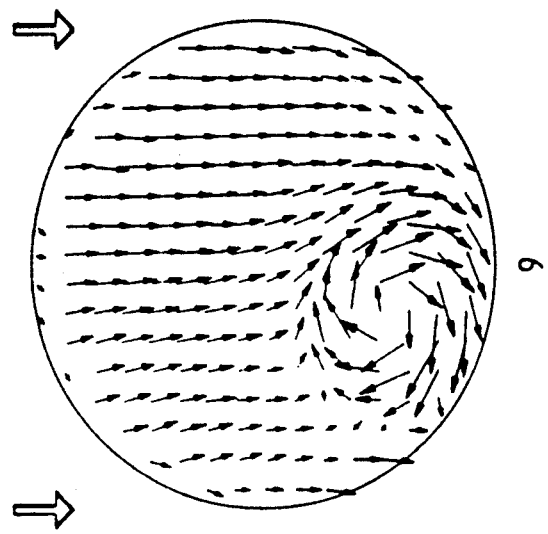
Figure 5A:
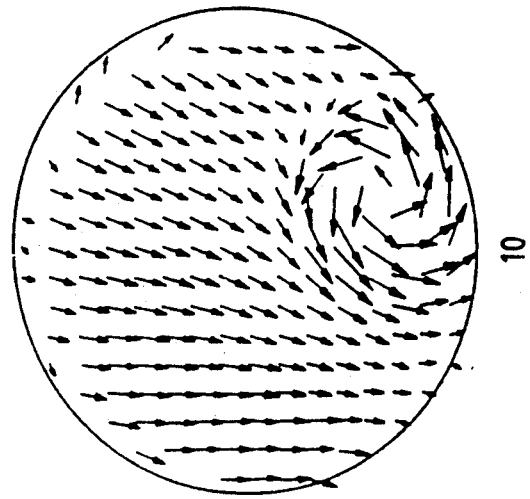
Figure 6A:
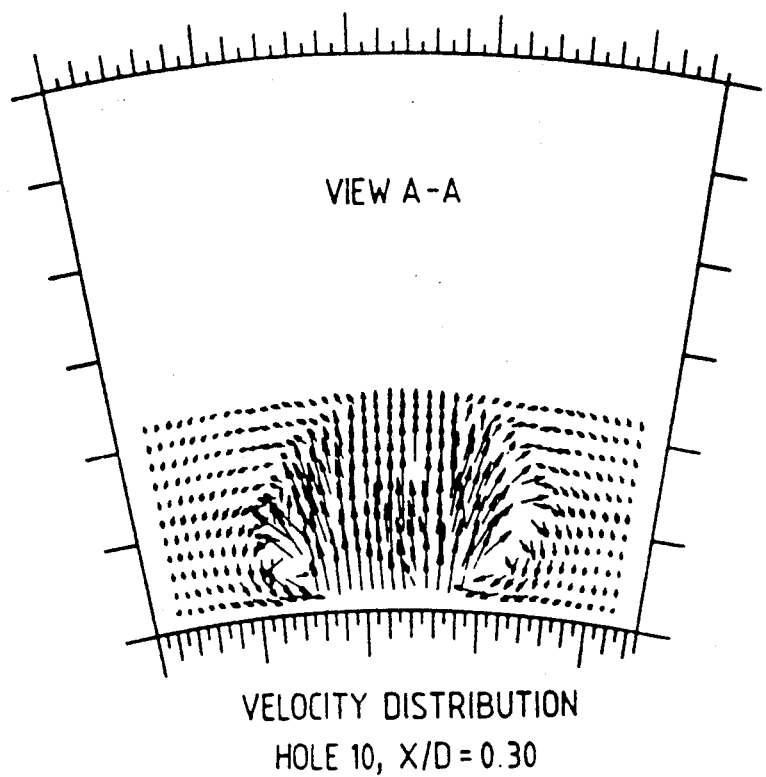
FIGS. 6a and 6b are cross-dilution zone plots of velocity and temperature respectively for a particular hole in the baseline configuration.
Figure 6B:
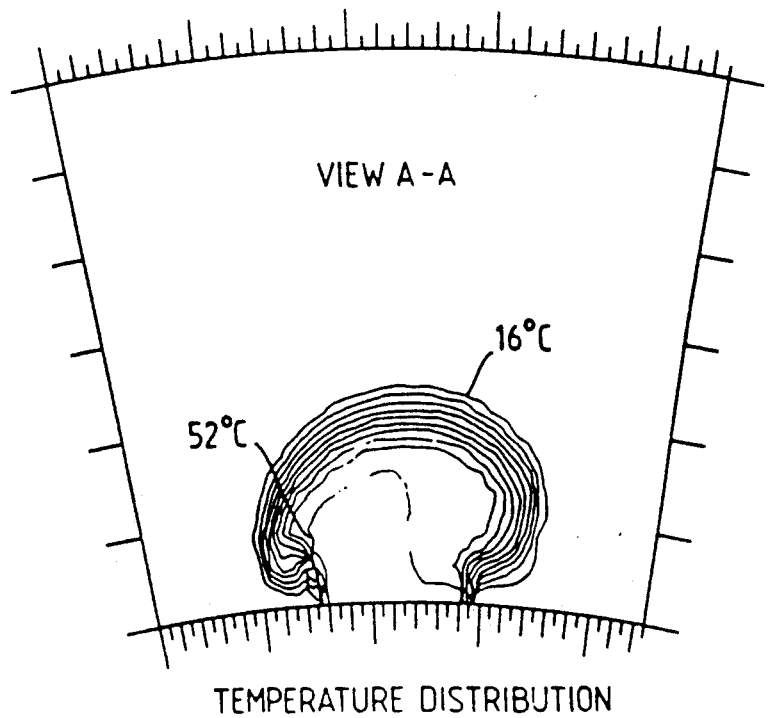
Figure 7A:
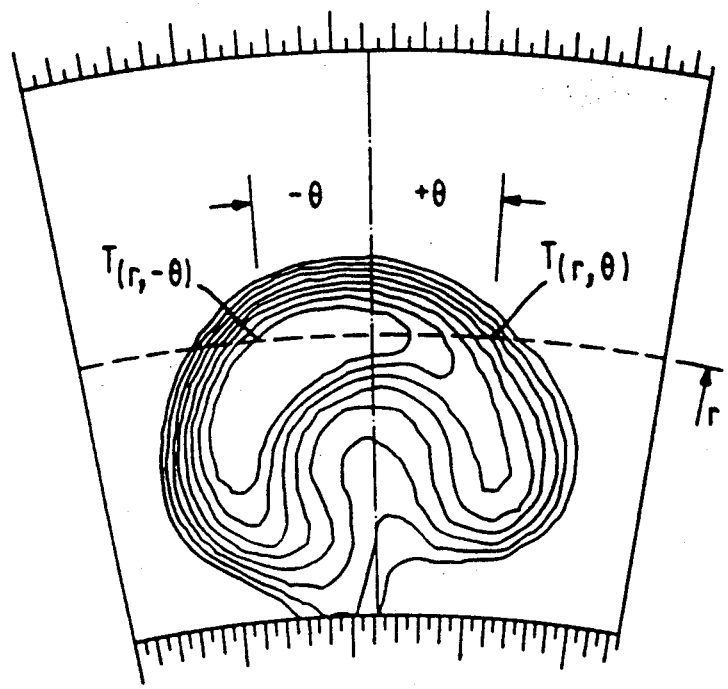
FIGS. 7a and 7b illustrate a measure, twisted, cross jet temperature plot for a particular hole in the baseline configuration and a derived idealised distribution for the same hole.
Figure 7B:
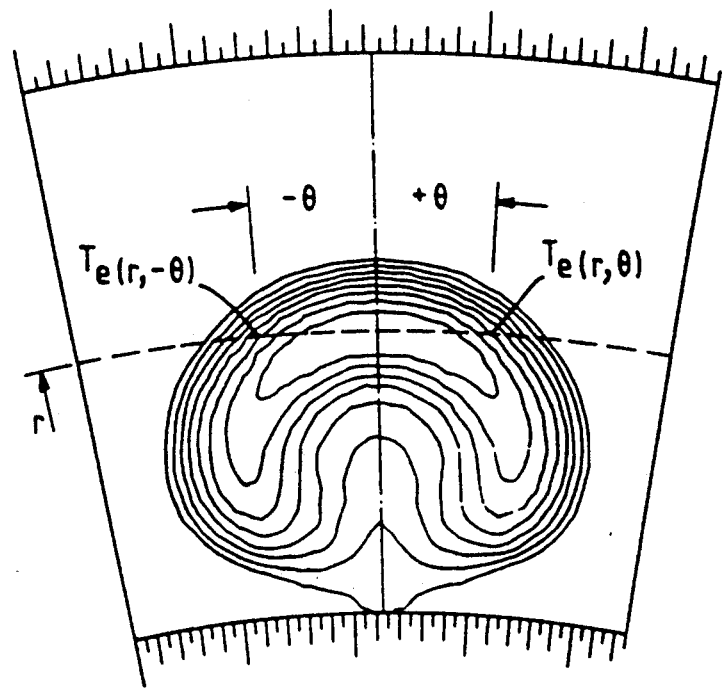

In order to demonstrate the nature and source of the particular problem addressed by this specification—that of randomness within the combustor outlet temperature traverse—the operation of the test rig with prior art hole geometrics is described below with reference to FIGS. 3 through 7. The dilution hole geometry, a simple plunged hole form, is depicted in FIGS. 3a, 3b and 3c. These Figures define also the measurement axes used throughout the remainder of this specification. Measurements given in the X direction are taken from the centre of the hole downstream and the respective X direction coordinate is rendered non-dimensional by expressing it as a fraction or multiple of the hole diameter D. Measurements in the Y direction are taken from the inner surface of passage 21. FIGS. 4a, 4b and 4c show a temperature contour in the YZ plane over a representative sector of the annular rig at a measurement station X/D=2.0. The scale is telescoped between alternate pairs of holes to save space. The jet patterns as reflected in their individual contours are in the main representative of the expected kidney shaped jet section but, although the jet sections are reasonable tied to their respective hole centre line regarding overall jet disposition in the Z direction, some of the jets exhibit a significant degree of twist. The jet from hole 10 repeatedly exhibits a severe degree of twist and the measurements reported below concentrate on hole 10 and its surrounding holes, but other jets exhibit twist to varying degrees and not all are twisted in the same direction. FIGS. 5a, 5b and 5c are vector charts of the jet flow from holes 8 to 10 at exit from the respective hole and resolved into components of velocity in the ZX plane. It will be seen that there is severe vortex flow within the jets from holes 9 and 10 and that these vortices are offset from the hole centre line. The rotational sense of the vortices in holes 9 and 10 is opposite. The flow at exit from hole 8 is much less subject to vorticity. In the case of holes 9 and 10, well defined vortices are present in the rear of the hole which have an important influence on jet development. The vortex flow pattern at the rear of hole 8 is not so well defined or so intense but nevertheless still exerts a great deal of influence on the development of the jet eg FIG. 4 indicates the amount of 'twist' or distortion of the temperature distribution at X/D=2.0 for hole 8 is almost as great as that for hole 10. FIGS. 6a and 6b give velocity and temperature plots in the YZ plane at a measurement station X/D=0.30 immediately upstream of the rearward limit of the hole, for hole 10 alone. The expected double vortex flow structure is already apparent within the jet flow but it is significantly lacking in symmetry. At the left side as seen the vortex is foreshortened in the Y direction compared to the right side. The asymmetrical flow pattern is reflected in the temperature contour plot and indeed is more easily seen here. Some quantitative measure of the degree of twist manifest in individual jet patterns is necessary for the purpose of realistic comparison between jets. The term 'jet asymmetry factor' (JAF) is used for this purpose. By averaging the temperature distribution in the YZ plane over a measured jet flow (FIG. 7A) an 'equivalent symmetric' distribution can be deduced and plotted (FIG. 7B) which has perfect symmetry in the YZ plane about the dilution hole centre line. The effect in real terms of the twisting distortion of the temperature distribution in an actual jet is to vary the maximum temperature at any given radius (Y direction) thereby influencing turbine entry profile. This effect is quantified in the calculation of JAF for a given radius. This calculation is based on the difference between the highest temperature recorded within a measured jet of a given radius and the highest temperature found within the derived 'equivalent symmetric' jet at the same radius. JAF is defined by the following expression:

$$JAF \text{ at radius} = (T_r - (T_e)_r / T_j - T_c)$$

where $T_c$ is reference crossflow temperature,
$T_j$ is reference jet temperature,
$T_r$ is maximum measured temperature at radius r, and
$(T_e)_r$ is maximum temperature at radius r within the derived 'equivalent symmetric jet'

Figure 8A:
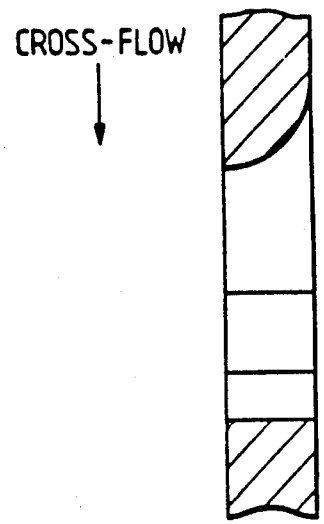
FIGS. 8a, 8b and 8c depict one inlet design exemplifying the invention.
Figure 8B:
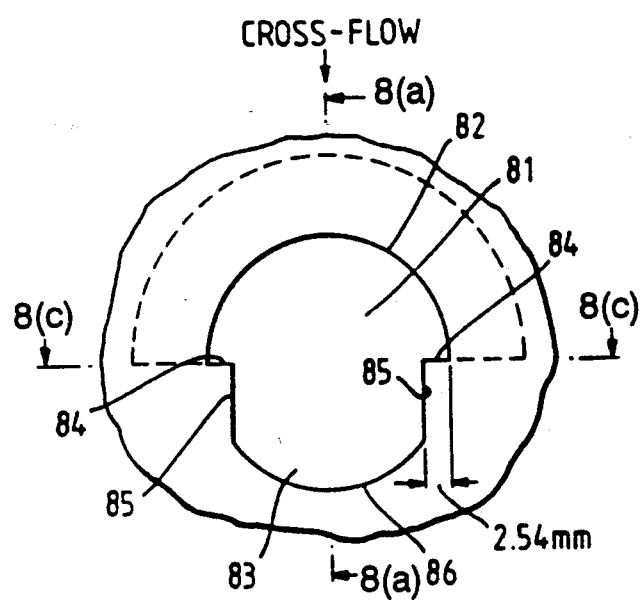
Figure 8C:
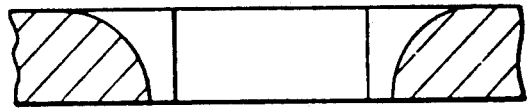
Figure 10:
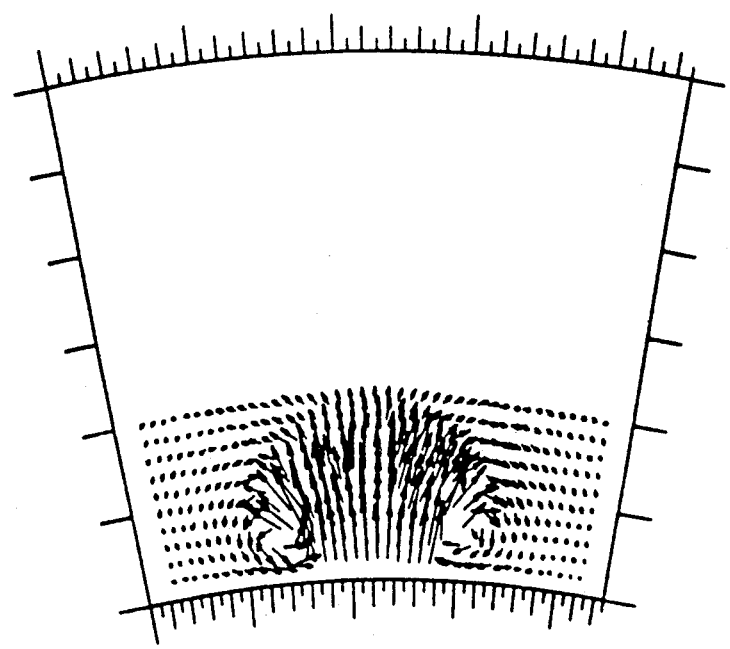
FIG. 10 is a cross-dilution zone velocity plot for the inlet design of FIG. 8.
Figure 9:
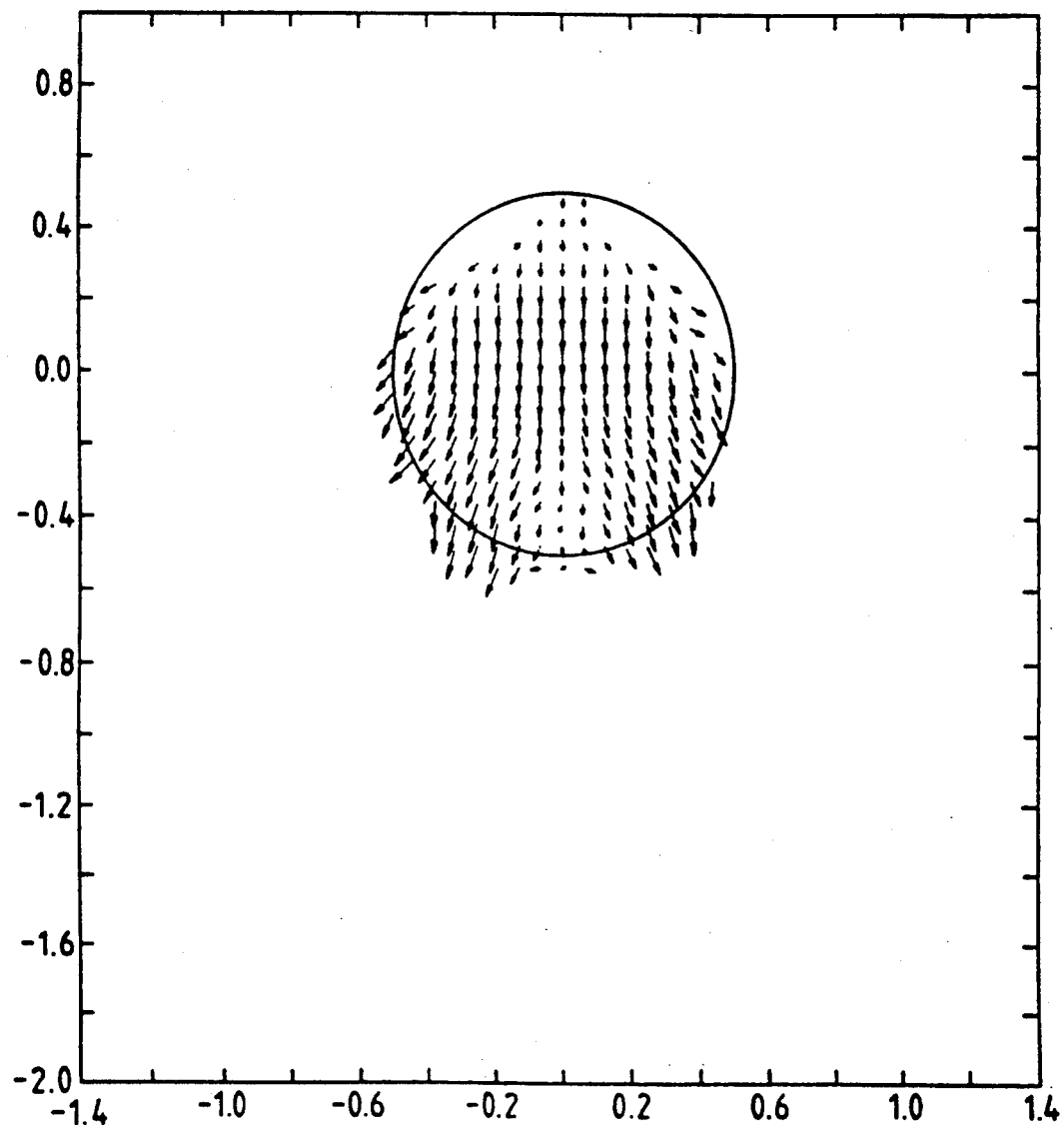
FIG. 9 is a cross-hole velocity plot for the inlet design of FIG. 8.
Figure 12A:
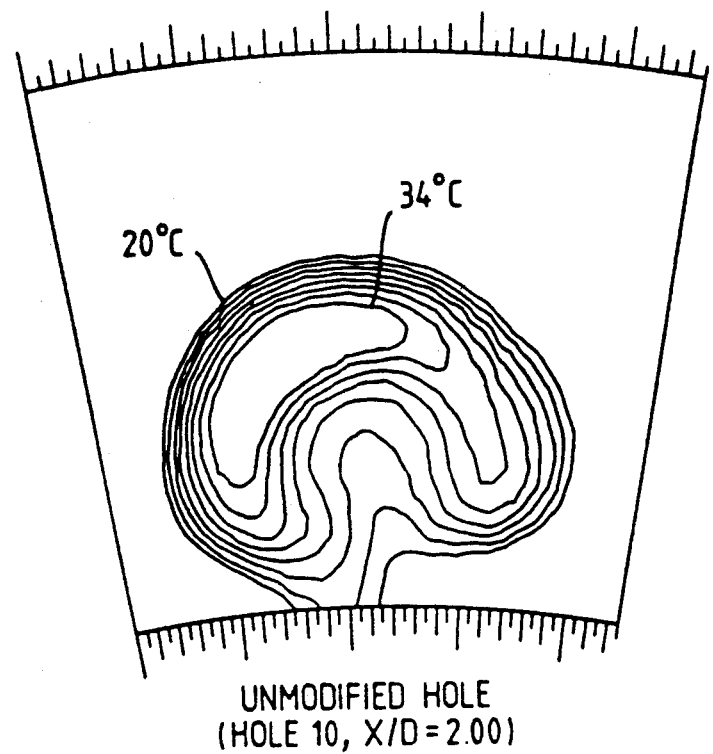
FIGS. 12a and 12b show a comparison in terms of cross jet temperature profile between the baseline inlet and the inlet design of FIG. 8 respectively.
Figure 12B:
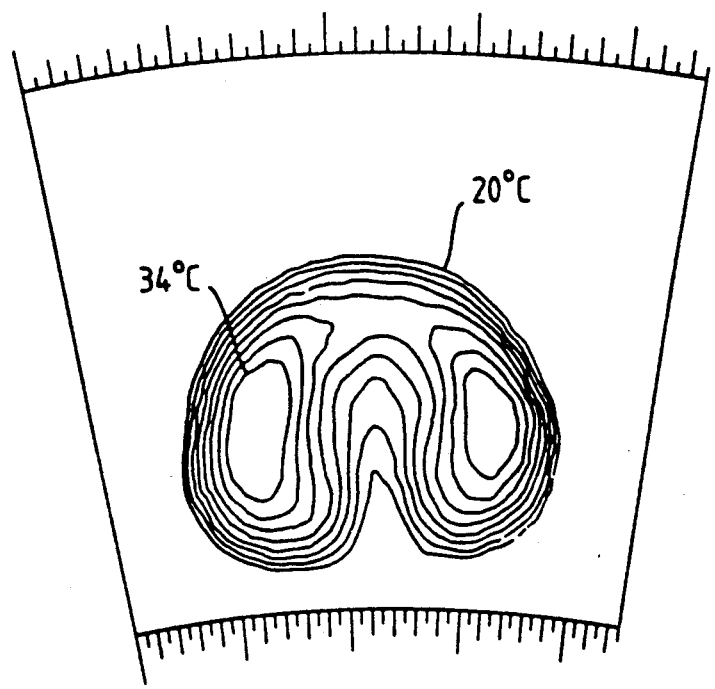

FIGS. 8a, 8b and 8c depict a novel form of air inlet exemplifying one form suitable for utilization in the claimed combustor within its dilution zone. The air inlet, designated 81, comprises a forward part 82 and a rearward part 83 with an abrupt change of section between these two parts on both lateral edges of the inlet. All these orientational designations relate to the configuration of the inlet 81 with respect to the predominant direction of crossflow which in the dilution zone will coincide with the longitudinal axis of the combustor. The exact form of the air inlet 81 is more easily ascertained from the Figures than from a written description but there are two significant features worthy of emphasis. The first of these is that the aforementioned change of section is such as to provide on each side of the inlet on the midway point a bluff face 84 which extends some way inwards from the lateral limit of the hole as defined by its forward part 82, These bluff faces 84 are set against the incoming feed flow from the air feed duct to the extent that this flow has a component of velocity transverse to the section of the inlet—ie the X direction—by virtue of momentum existing in the feed duct. A portion of flow at each lateral extreme of the jet interacts with the bluff face 84 being either scooped upwards and projected in the Y direction or deflected inwards within the jet. This action creates or leads to a strong vortex recirculation at the lateral edges of the jet in the zone of interaction with the crossflow. The second of these significant features concerns the rearward part of the inlet behind the bluff faces 84. Here the inlet is delimited by straight-through unbevelled walls (so emphasising wall depth), and the inlet section has parallel side walls 85 leading to a part circular rear wall 86. This combination of face form and encapturing section is such as to discourage lateral (Z axis) deviations and spillage of jet flow and such as to reinforce the stream from the jet at the rear of the inlet in respect to jet velocity in the Y direction. The plan view of the flow through and out of this inlet is given in FIG. 9. This should be compared with FIGS. 5a, 5b and 5c which give a similar view for adjacent inlets to the baseline design. The flow out of this novel inlet is devoid of the off-center vortex recirculation found in the baseline at the rear of the inlet. The flow out of this inlet shows good symmetry. The start of a stabilizing vortex flow can be seen on top of the bluff faces 84. These vortices can be seen more readily in FIG. 10 which gives a cross-dilution zone (YZ plane) velocity traverse at a position X/D=0.3. FIG. 10 should be compared with FIG. 6a. In FIG. 10 the double vortex flow pattern exhibits considerably improved symmetry about the hole centre line. FIG. 11 depicts a comparison between the same inlet designs, this time at a station X/D=2 where the mixing pattern is better established, and given in terms of JAF. FIG. 11 provides a plot of JAF at various Y axis positions for baseline and improved inlets. The improvement in this regard secured by the improved design is immediately apparent. This improvement is confirmed by analysis of FIGS. 12a and 12b which give a side by side comparison of temperature contours for both inlet designs in the YZ plane across the jet at the same station X/D=2.0. That contour for the improved inlet is detached from the wall of the dilution zone and is of the anticipated kidney shape with improved internal symmetry.

Figure 13A:
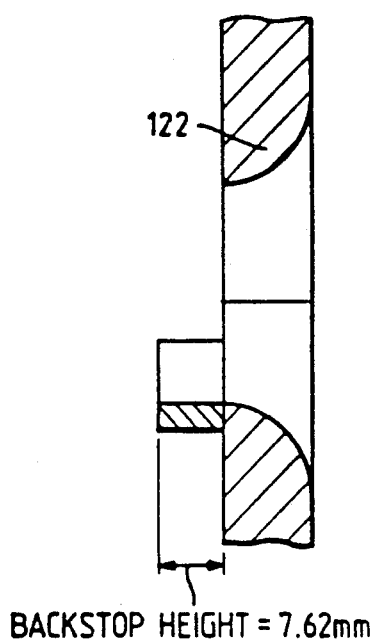
FIGS. 13a, 13b and 13c depict another inlet design exemplifying the invention.
Figure 13B:
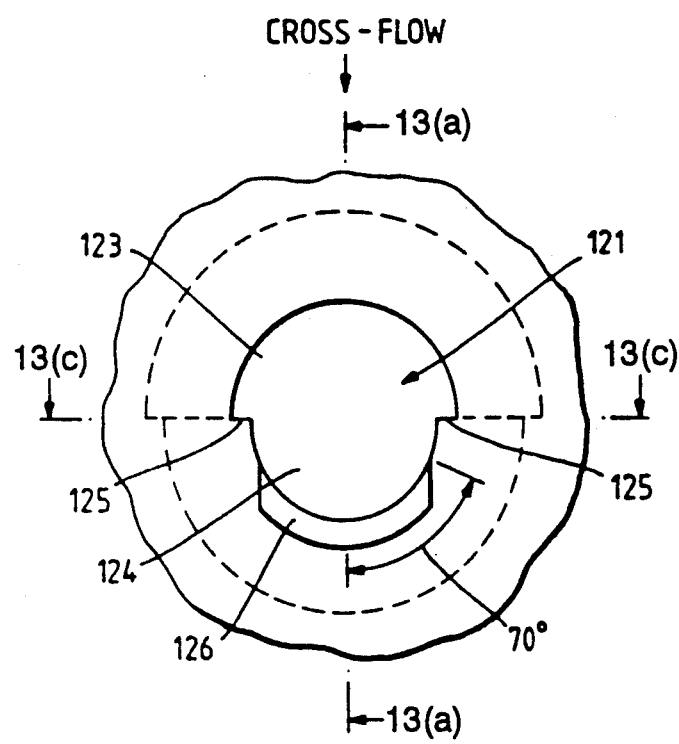
Figure 13C:
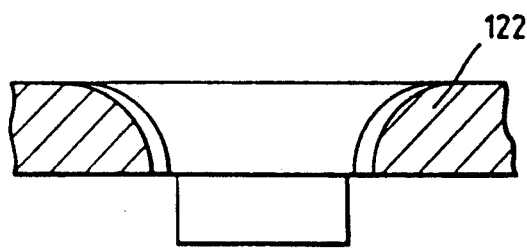
Figure 14:
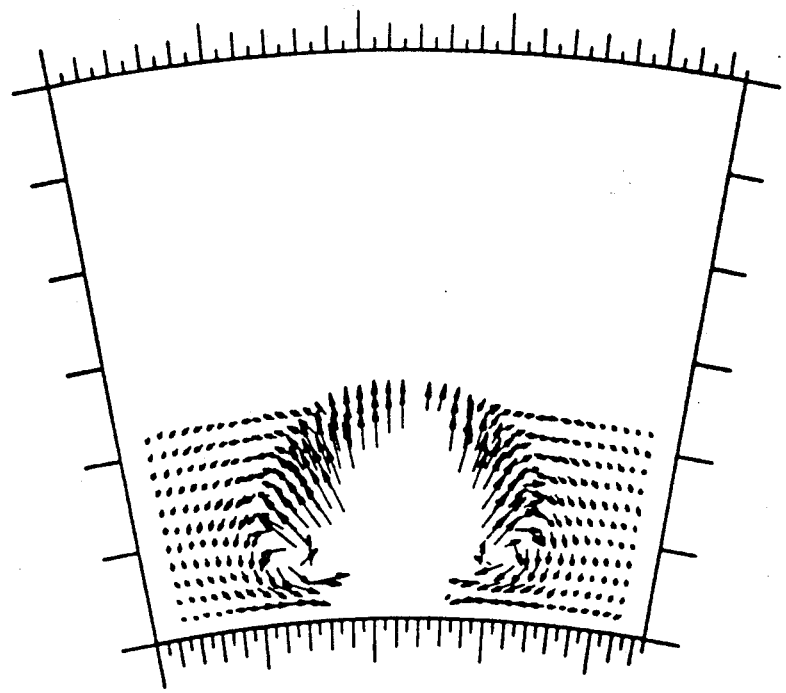
FIG. 14 is a cross-hole velocity plot for the inlet design of FIG. 13.
Figure 15A:
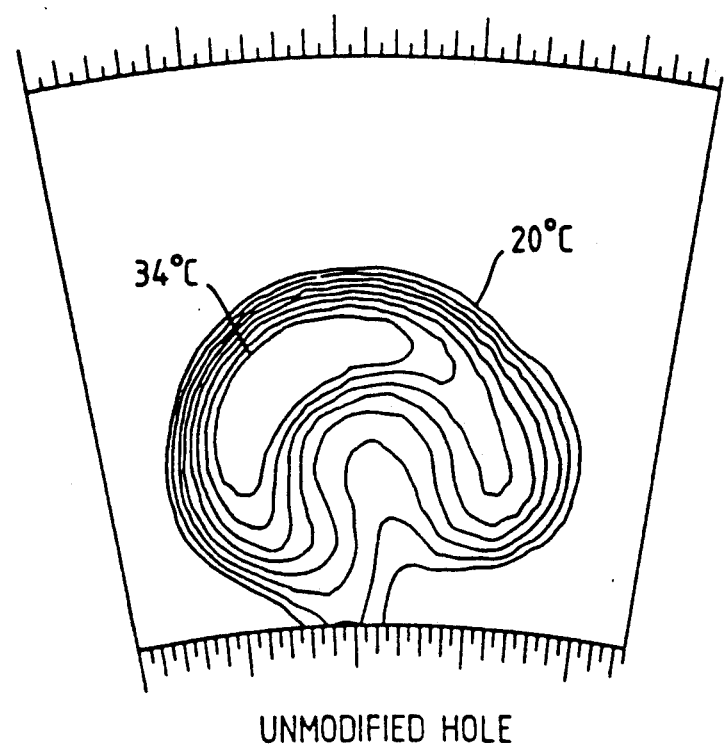
FIGS. 15a, 15b and 15c show a comparison in terms of cross jet temperature profile between the baseline inlet and the inlet design of FIGS. 13a, 13b and 13c.
Figure 15B:
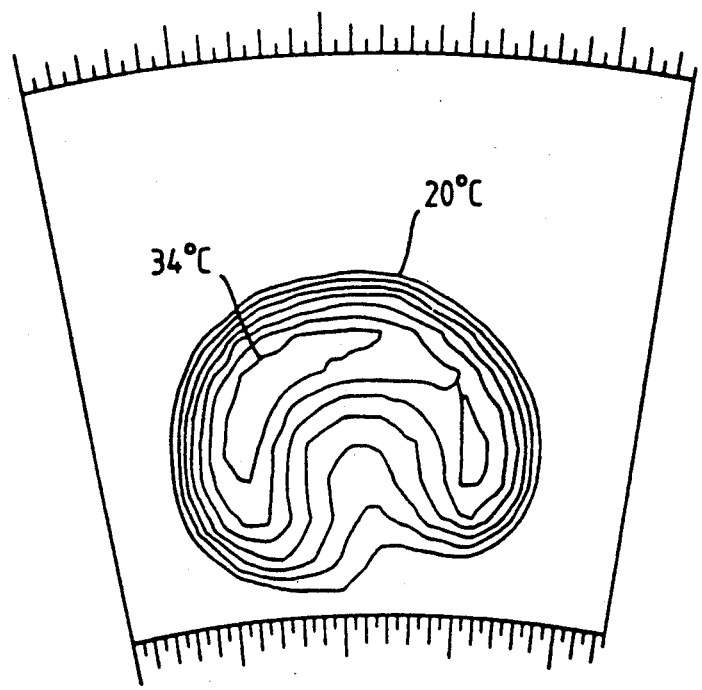
Figure 15C:
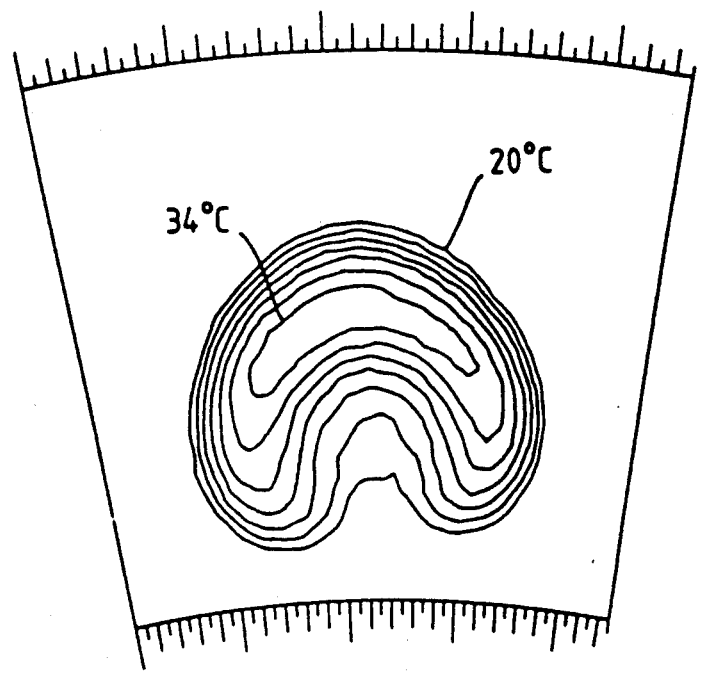
Figure 16:
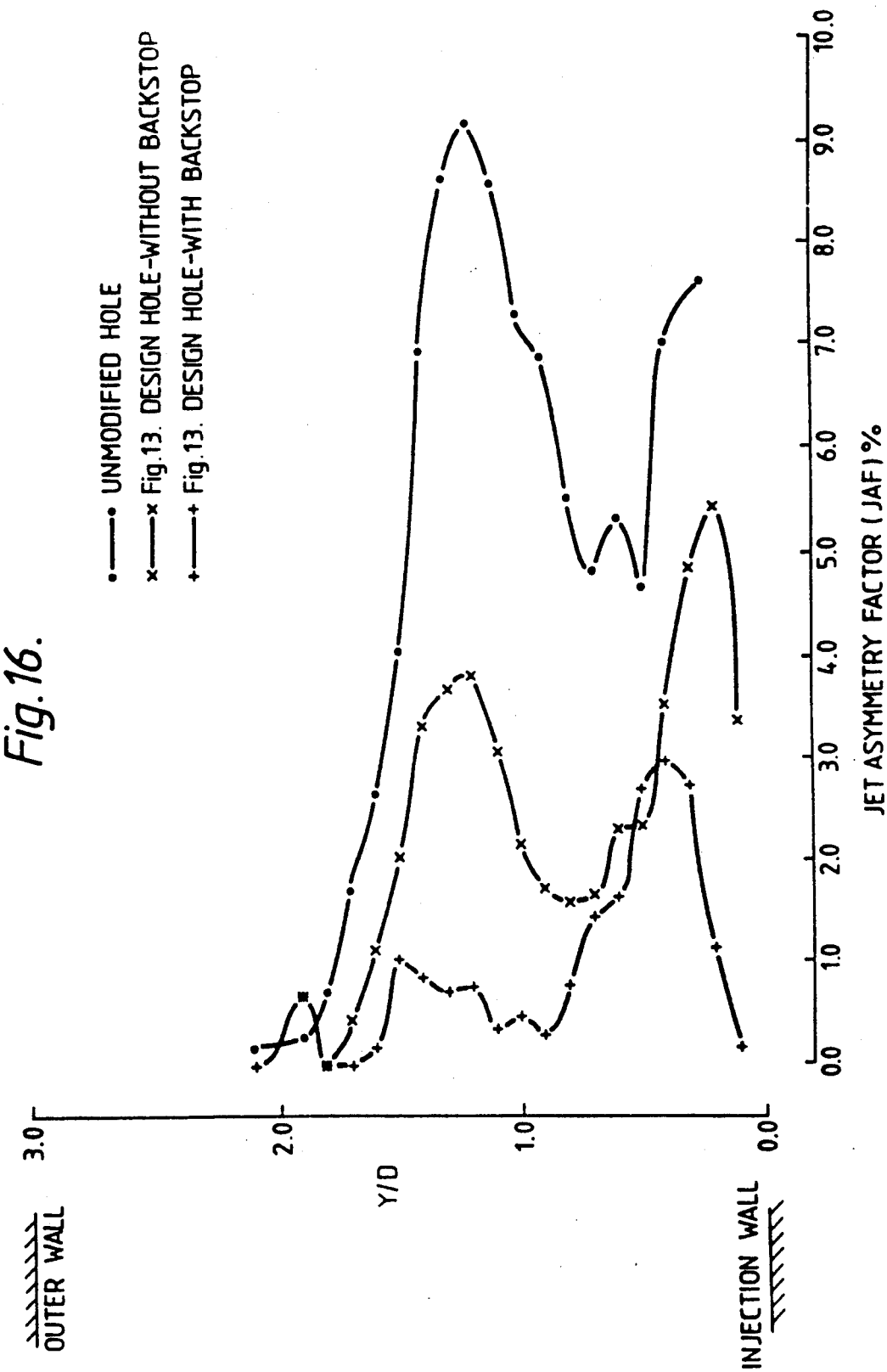
FIG. 16 is a plot of jet asymmetry factor for the baseline inlet and the inlet design of FIGS. 13a, 13b and 13c, and FIGS. 17a and 17b; 18a and 18b; 19a and 19b; 20a and 20b; 21a and 21b; and 22a and 22b show alternative inlet designs exemplifying the invention.

FIGS. 13a, 13b and 13c show a second air inlet form suitable for utilization in the claimed combustor. This air inlet designated 121 is of plunged form all round the inlet side so as to provide a bevel 122. However the hole radius in the inlet's forward part 123 is greater than the hole radius in the rearward part 124 and there is a step change in section between the two parts on the transverse diameter of the inlet. This provides a forward facing bluff body vortex generator 125 on each side of the inlet 121. At the rear of the inlet 121, on the side of the combustion liner exposed to the crossflow there is a projecting, part-circular backstop projection 126 which has a plain unbevelled forward face. The inlet form shown in these Figures has been tested in rig tests in the form exactly as shown and in an alternative form with the backstop removed. Some of these test results are presented in FIGS. 14–16. FIG. 14 gives a velocity plot in the cross-dilution zone plane (YZ plane) at a station X/D=0.3 for the non-backstopped version. A well developed and relatively symmetrical double vortex structure is apparent. This should be compared with the plot for the baseline configuration given in FIG. 6a. FIGS. 15a, 15b, 15c and 16 give results for a station further downstream at X/D=2.0, the former showing temperature contours across the jet in the YZ plane and the latter providing a plot of JAF. In both these examples the improvement obtained over the configuration shown in FIGS. 13a, 13b and 13c without the backstop is apparent, this being the improvement attributable to the vortex generators alone. However it is significant that the backstopped version yields even further improvement.

This backstop would seem to equate in function to the plain wall rear wall portion 86 of the inlet 81 depicted in FIGS. 8a, 8b and 8c. The backstop 126 would seem to lie within the shadow of protection offered by the cool jet flow against the full heat of the combustion gases. However, this has not been investigated. It is customary to avoid projections on the hot side of the combustion liner to the extent that they can be avoided but there could be situations where a suitable shielded projecting backstop such as that depicted in FIGS. 13a, 13b and 13c could provide improvement in jet flow sufficient to warrant use.

Figure 17A:
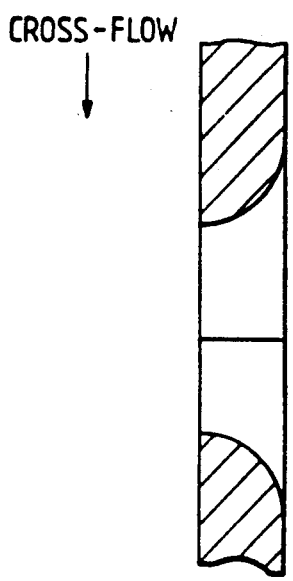
Figure 17B:
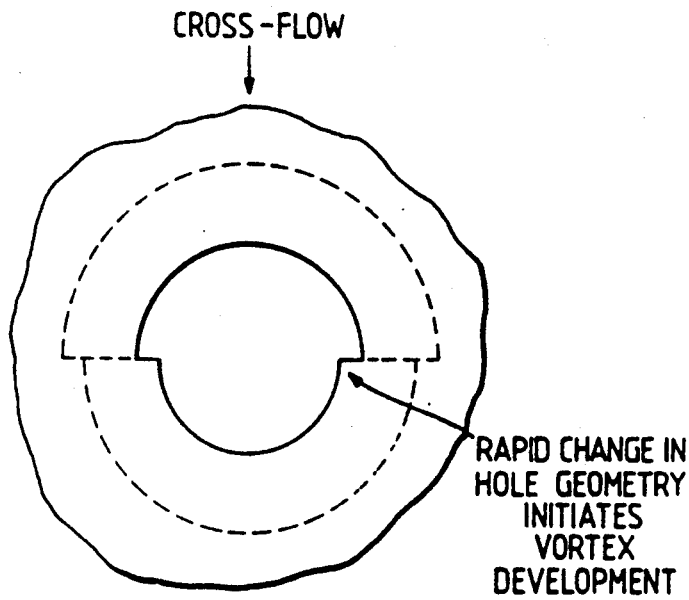
Figure 18A:
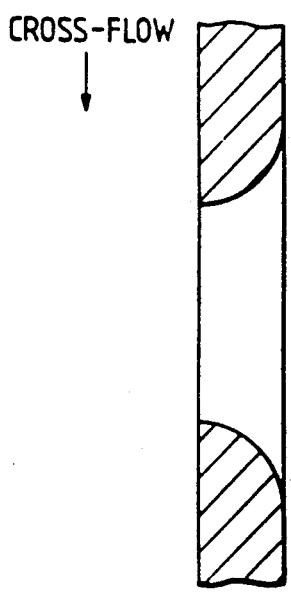
Figure 18B:
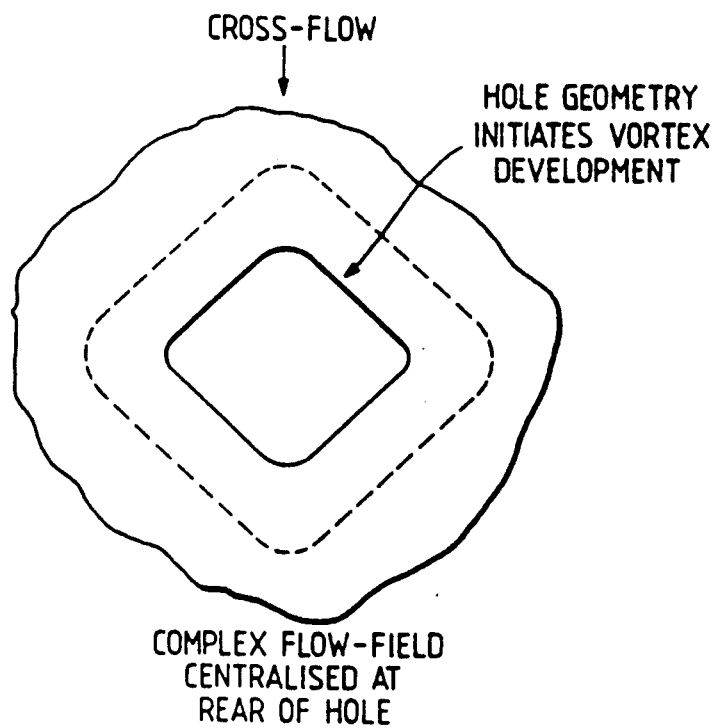
Figure 19A:
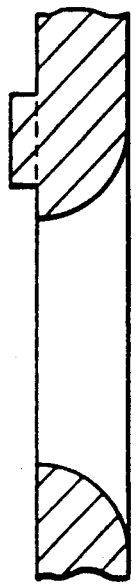
Figure 19B:
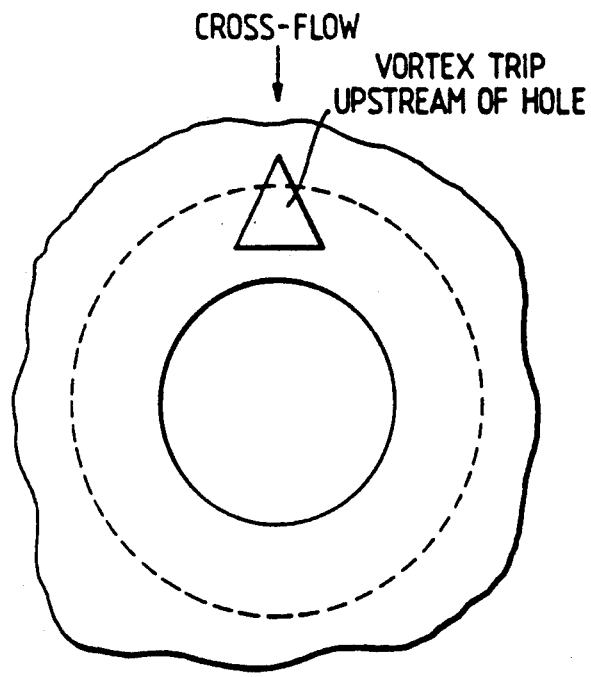
Figure 20A:
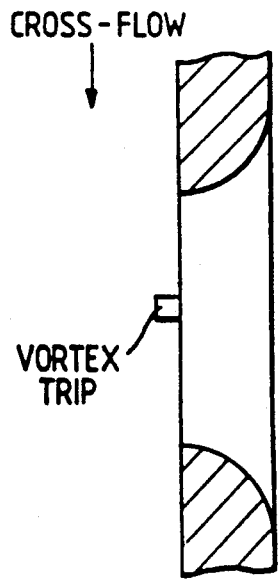
Figure 20B:
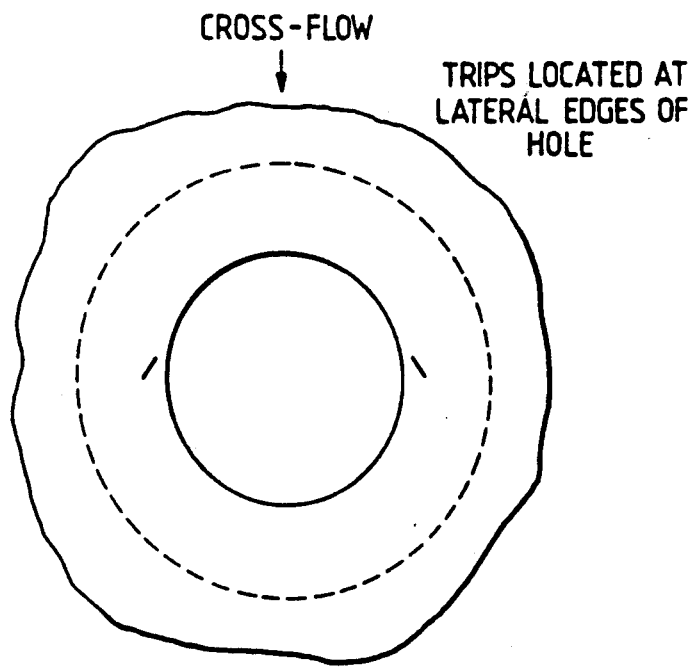
Figure 21A:
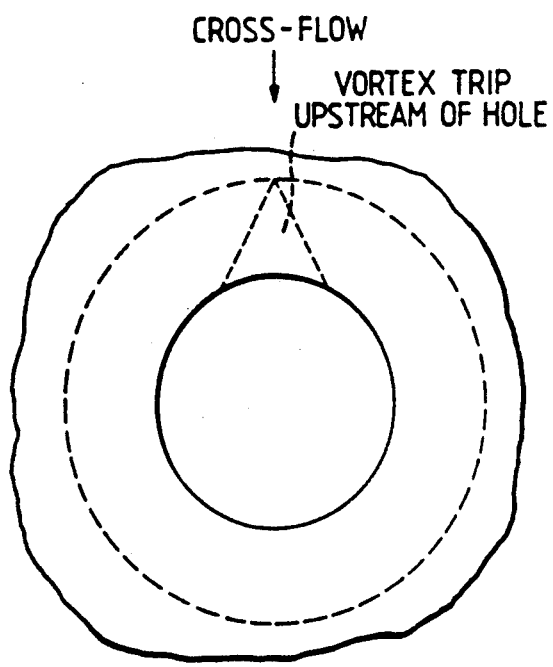
Figure 21B:
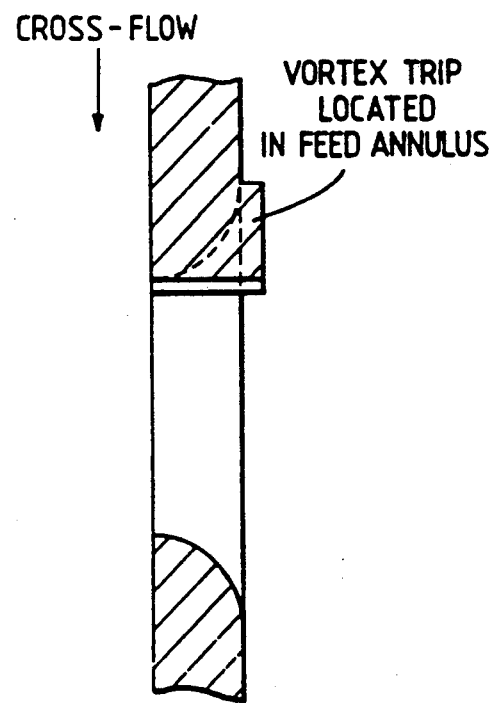
Figure 22A:
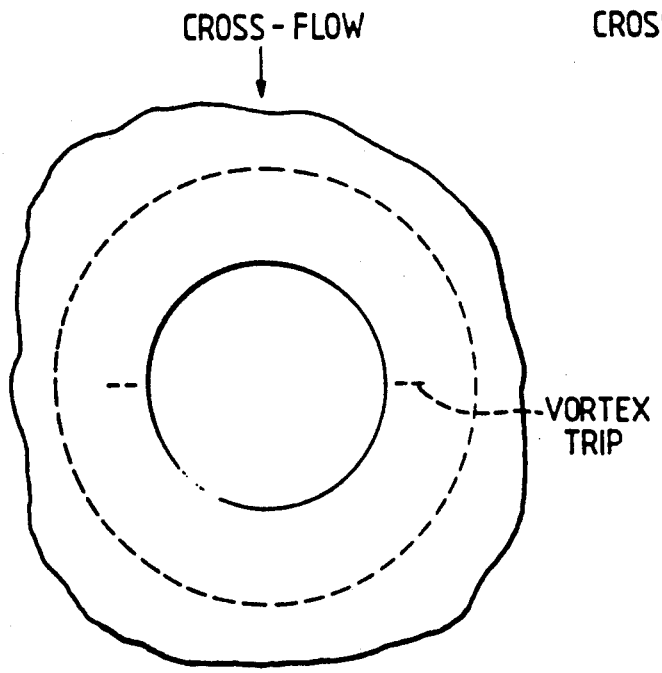
Figure 22B:
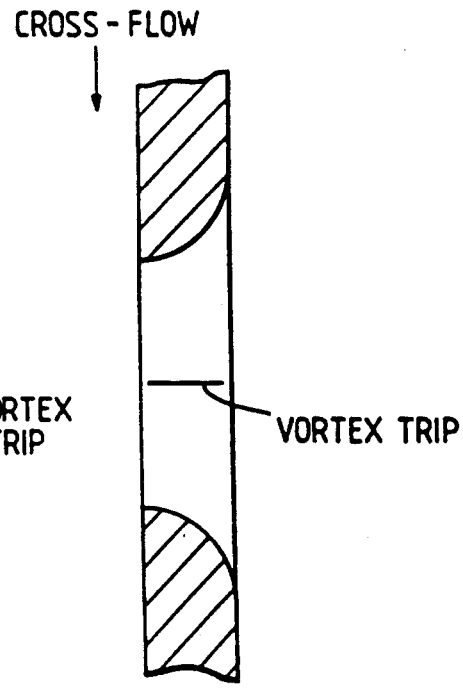

Some other alternative forms of air inlet suitable for use in the claimed combustor are depicted in FIGS. 17a and 17b; 18a and 18b; 19a and 19b; 20a and 20b; 21a and 21b; and 22a and 22b.

The invention has been described above largely in the context of a combustor having a field or band of these new inlets in its dilution zone, because it is in this zone where the problem which gave rise to these inlets first became apparent. It is clear however that the flow phenomenon exemplified in the dilution zone is not confined to that zone. The same factors of jet interaction with crossflow and jet feed through inlets transverse to air feed flow apply within any secondary/intermediate zone and could apply within the primary zone also. It follows that this inlet configuration can be applied elsewhere in the combustor and accordingly the invention as claimed is not restricted only to those combustors having the air inlets in the dilution zone. These inlet configurations can be utilized in place of inlets of prior art form for those inlets for example designated 9–12 of FIG. 1.

We claim:
1. A gas turbine engine combustor having a longitudinal axis extending between an upstream end and a downstream end, the combustor comprising:
   a combustion liner having an interior and an exterior;

an air casing positioned around the exterior of the combustion liner and spaced therefrom;

an air duct between the combustion liner and the air casing, and during operation of the combustor, air flows along the air duct in a generally downstream direction;

said combustion liner including an array of through-holes comprising air inlets communicating between the air duct and the interior of the combustion liner through which air passes into the interior of the combustion liner as jets which meet a generally downstream flow of combustion gases; and each air inlet is provided with a respective vortex generator means which comprises a pair of upstream-facing trip surfaces, each of said trip surfaces projecting inwardly from a respective lateral edge of the air inlet relative to the longitudinal axis of the combustor, wherein each of the trip surfaces of an air inlet establishes in the flow through the air inlet a respective vortical flow to create a vortex pair associated with each air inlet, the respective vortical flows in a vortex pair being of opposite rotational sense to each other and having a sense of rotation such that each vortex is reinforced by interaction with the flow of combustion gases.

2. A gas turbine engine combustor having a longitudinal axis extending between an upstream end and a downstream end, the combustor comprising:

a combustion liner having an interior and an exterior;

an air casing positioned around the exterior of the combustion liner and spaced therefrom;

an air duct between the combustion liner and the air casing, and during operation of the combustor, air flows along the air duct in a generally downstream direction;

said combustion liner including an array of through-holes comprising air inlets communicating between the air duct and the interior of the combustion liner through which air passes into the interior of the combustion liner as jets which meet a generally downstream flow of combustion gases; and each air inlet is provided with a respective vortex generator means which comprises a pair of upstream-facing trip surfaces, each of said trip surfaces projecting away from the through-hole constituting the air inlet, wherein each of the trip surfaces of an air inlet establishes in the flow through the air inlet a respective vortical flow to create a vortex pair associated with each air inlet, the respective vortical flows in a vortex pair being of opposite rotational sense to each other and having a sense of rotation such that each vortex is reinforced by interaction with the flow of combustion gases.

3. A gas turbine engine combustor as claimed in claim 1 in which each air inlet of said array comprises an upstream part and a downstream part with an abrupt change of section between the two parts and with the downstream part having a lesser transverse dimension than the upstream part.

4. A gas turbine engine combustor as claimed in claim 3 in which each air inlet of said array has a downstream part comprising parallel side walls leading to a part circular downstream wall, wherein said side walls and downstream wall have plain unbevelled faces.

5. A gas turbine engine combustor as claimed in claim 3 in which each air inlet of said array incorporates a backstop projection positioned at a downstream periphery of the air inlet on the interior of the combination liner.

6. A gas turbine engine combustor as claimed in claim 1 in which said array of air inlets is distributed over an area of said combustion liner downstream of a region of the combustor in which complete combustion takes place.

7. A gas turbine engine combustor as claimed in claim 3 in which said array of air inlets is distributed over an area of said combustion liner downstream of a region of the combustor in which complete combustion takes place.

* * * * *